Patented Apr. 18, 1950

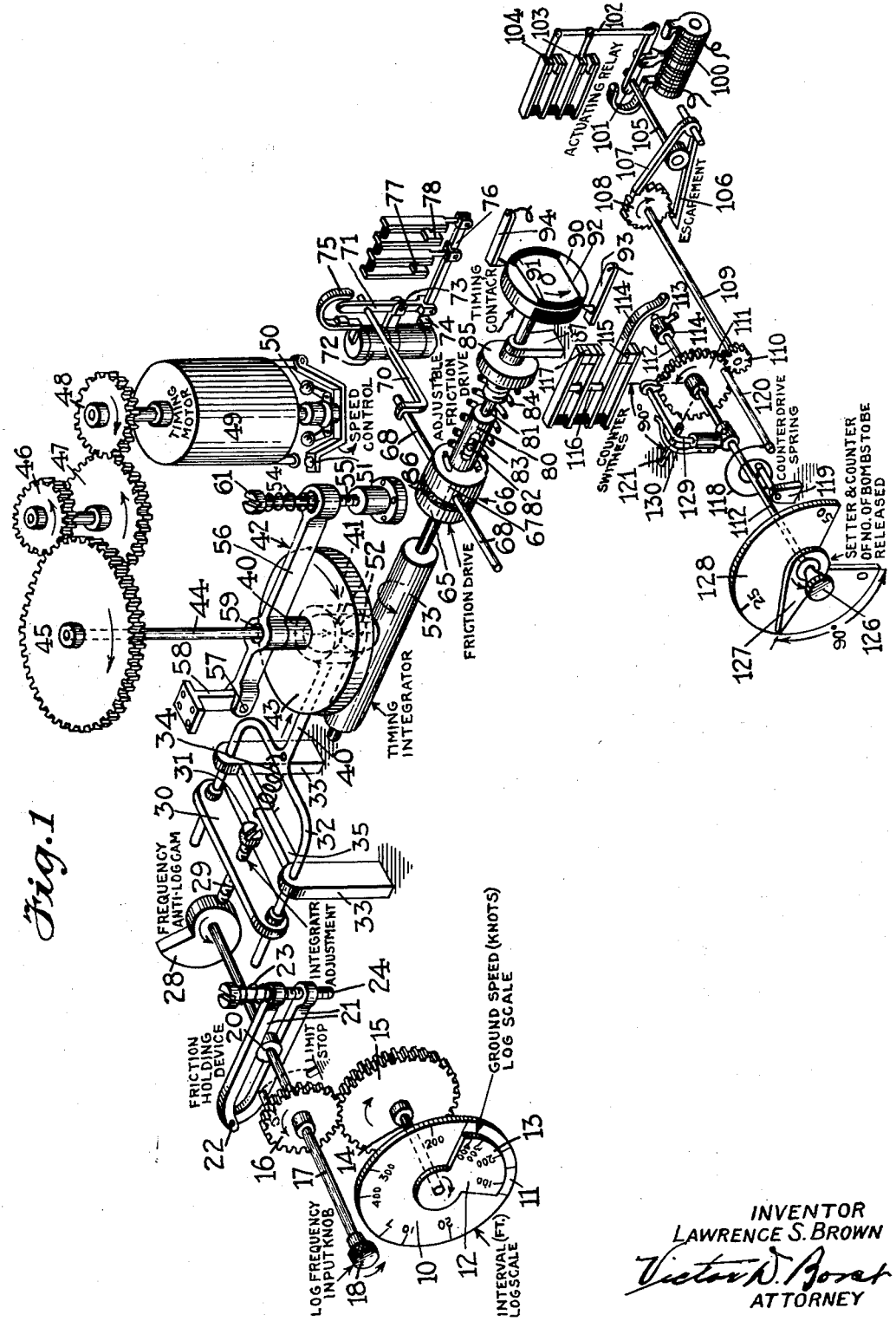

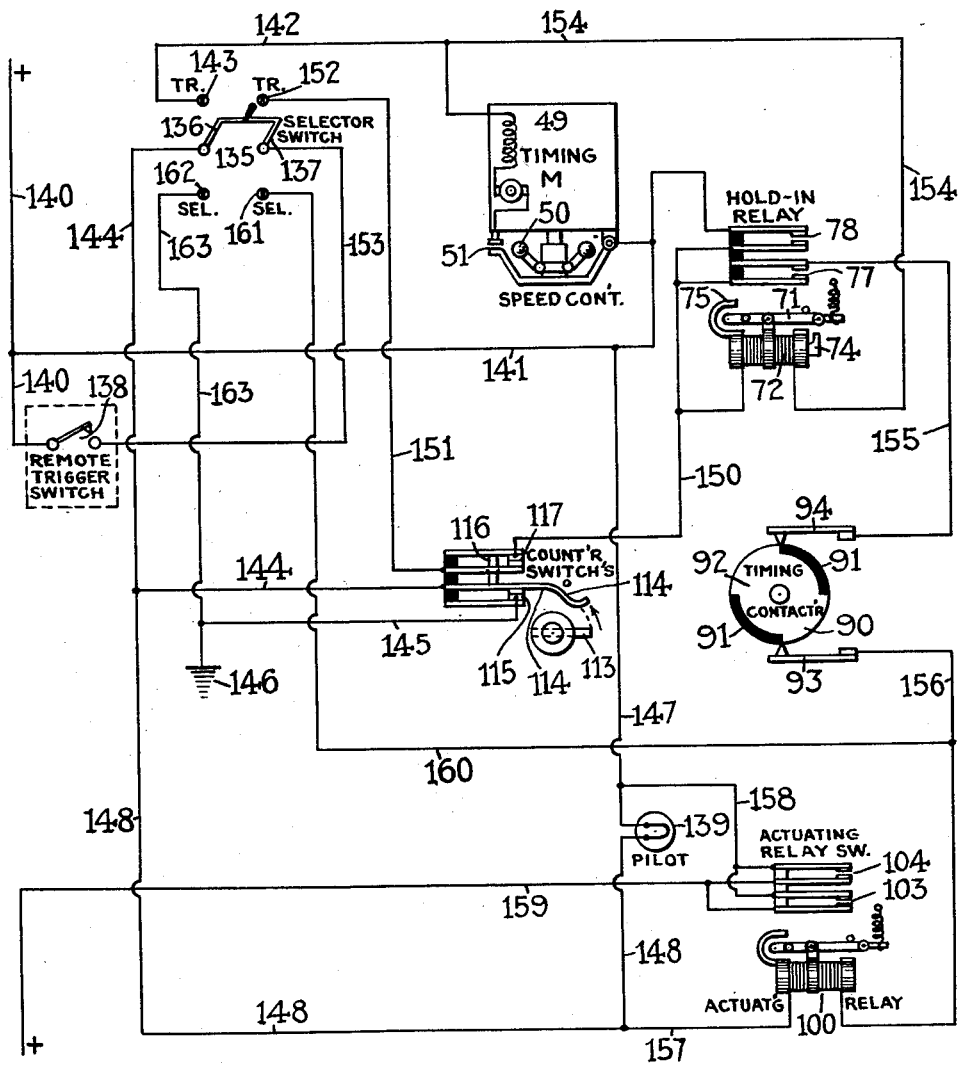

2,504,492

UNITED STATES PATENT OFFICE 2,504,492

BOMB RELEASE SYSTEM

Lawrence S. Brown, Long Island City, N. Y., assignor to The Sperry Corporation, a corporation of Delaware Application January 26, 1946, Serial No. 643,770

4 Claims. (Cl. 177—380)

This invention relates to timed bomb release mechanism and more particularly to mechanism for automatically releasing a string of bombs in predetermined timed sequence.

An object of the invention is to provide a mechanism of the above type having means to adjust the timing for selected intervals between release impulses.

Another object is to provide a counter mechanism which is suitable for the release of a selected number of bombs in a string.

Another object is to provide a mechanism of the above type which is comparatively simple, rugged and dependable for use under military conditions.

Various other objects and advantages will be apparent as the nature of the invention is more fully disclosed.

Although the novel features which are characteristic of this invention are pointed out more particularly in the claims the nature of the invention will be better understood by referring to the following description, taken in connection with the accompanying drawings in which a specific embodiment has been set forth for purposes of illustration.

In the drawings:

Fig. 1 is a schematic diagram of one form of apparatus for carrying out the present invention; and Fig. 2 is a schematic wiring diagram of the electric circuit involved in the apparatus of Fig. 1.

Referring to the drawings more in detail the mechanism is shown as having a stationary dial 10 having a scale 11 around its periphery graduated as a log scale of the interval or spacing of the bombs in feet and a dial 12 having a scale 13 graduated as a log scale of the ground speed in knots. The dial 12 is mounted on a shaft 14 to rotate concentrically with the dial 10 so that the selected interval on the scale 11 can be aligned with the known ground speed on the scale 13. The position of the shaft 14 thus represents the log of the frequency of release required to obtain the desired spacing of the bombs along the ground.

The shaft 14 carries a gear 15 meshing with a gear 16 on a shaft 17 which carries a knob 18 accessible to the operator for use in setting the dial 12.

The shaft 17 also carries a drum 20 which is engaged by a pair of arms 21 pivoted at 22 and pressed against the drum 20 by a spring 23 seated on a pin 24 which extends through a hole in the top arm 21 and is threaded into the lower arm for adjustment of the spring tension. The drum 20 and arms 21 constitute a friction device for holding the shaft 17 in any setting.

The shaft 17 carries a cam 28 which is shaped to have an anti-log function and is engaged by a pin 29 which is threaded in a bar 30 and is adjustable by a screw head 31. The bar 30 is mounted on a U-shaped yoke 32 which is slidable in supports 33. A tension spring 34 connected between the yoke 32 and a bar 35 joining the supports 33 holds the pin 29 against the cam 28. The cam 28 converts the log frequency function of the shaft 17 to a linear frequency function of the positions of the pin 29 and yoke 32.

The yoke 32 carries an arm 40 which controls the position of the ball cage 41 of a two-ball integrator 42. The integrator 42 includes a disc 43 mounted on a shaft 44 and driven by a gear train including gear 45 to 48 by a constant speed motor 49. In the embodiment shown the motor 49 is provided with a governor 50 operating a driving contact 51 which is designed to maintain the speed of the motor 49 substantially constant.

The disc 43 bears against balls 52 in the ball carriage 41 which in turn bear against a roller 53. The disc, ball and roller are held in frictional engagement by a spring 54 which is seated on a stationary threaded pin 55 and bears against an arm 56 which is pivoted at 57 to a stationary support 58 and has a collar 59 which bears against the hub 60 of the disc 43. The tension of the spring 54 is adjusted by means of a screw head 61 on the threaded pin 55.

The roller 53 is connected to drive a disc 65 of a friction clutch 66. The clutch 66 includes the driven disc 67 having a pair of arms 68 extending outwardly therefrom and mounted to rotate therewith. The driven disc 67 may normally be held against rotation by means of a latch 70 which engages one of the arms 68.

The latch 70 is connected to the armature 71 of an electromagnet 72 and is positioned to be pulled out of engagement with the arm 68 when the electromagnet is energized. For this purpose the armature 71 is pivoted at 73 and cooperates with pole pieces 74 and 75 of the electromagnet 72 to move in a clockwise direction when the electromagnet is energized. The armature 71 is also connected to a pin 76 which is connected to close pairs of relay contacts 77 and 78 respectively when the electromagnet 72 is energized.

The driven disc 67 of the clutch 66 drives a sleeve 80 which is pinned to a shaft 81 by means of a pin 82 which lies in an elongated slot 83 in the sleeve 80. The disc 67 is held in frictional engagement with the driving disc 65 by means of a spring 84 which is seated between the disc 67 and a collar 85 which is threaded on to the shaft 81 for adjustment axially of said shaft so as to control the tension of the spring 84. A friction disc 86 may be interposed between the discs 65 and 67 for driving purposes.

The shaft 81 is journaled in a stationary support 87 which forms a thrust bearing to oppose the thrust of the spring 84 and carries a commutator 90 which is made of insulating material and is provided with a pair of conducting segments 91 which are connected together by a conducting wire 92. Brushes 93 and 94 bear against the commutator 90 and complete an external circuit when they are in engagement with the conducting segments 91. The brushes 93 and 94 are connected by a circuit to be described to control the operation of an electromagnet 100 having a pivoted armature 101 connected by a pin 102 to close pairs of contacts 103 and 104 respectively when the electromagnet is energized. The armature 101 also carries a pin 105 which actuates pawls 106 and 107 engaging a ratchet 108 which constitutes a counter-mechanism and allows the ratchet 108 to rotate one notch in a clockwise direction each time the electromagnet 100 is operated.

The ratchet 108 is mounted on a shaft 109 carrying a pinion 110 driving a gear 111 loosely mounted on a shaft 112. The shaft 112 carries at one end a pin 113 which is adapted to engage a spring arm 114 to break a normally closed contact 115 when the pin 113 is rotated into engagement with the arm 114. The arm 114 also actuates a pin 116 to break a normally closed contact 117 so that the contacts 115 and 117 are normally closed, but are opened when the rotation of the shaft 112 brings the pin 113 into position to engage the spring arm 114. The shaft 112 is biased by a spring 118 anchored to a fixed support 119 and engaging a stud 120 which is connected to the gear 111. The spring 118 supplies the proper bias for causing the ratchet 108 to be actuated when the pawls 106 and 107 are respectively released.

The position of the pin 113 is set by an actuating knob 126 on the shaft 112 located in an accessible position and carrying a pointer 127 which registers with a stationary dial 128 graduated to indicate the selected numbers of impulses. The shaft 112 carries an arm 129 which is spring-pressed by a spring 130 against the teeth of the gear 111 and shaped to turn the gear 111 in a clockwise direction with the ratchet 108, but to slide over the teeth of the gear 111 when turned in a counter clockwise direction, in which direction the gear is prevented from turning by the ratchet. The spring arm 129 thus allows the shaft 112 to be adjusted in either direction without releasing the pawls 106 and 107.

A stop pin 121 engages the arm 129 and the stud 120 to limit the extent of movement of the shaft 112 and of the gear 111 in a counter clockwise direction so as to prevent the pin 113 from overriding the spring arm 114. The pin 121 is positioned to stop the shaft 112 with the pin 113 in circuit opening position.

Referring now to Fig. 2, the control circuit includes a selector switch 135 having two poles 136 and 137, a remotely located trigger switch 138 which is accessible to the operator and a pilot light 139. The remaining elements of Fig. 2 have been identified above.

Power supply is taken from a lead 140 which may be connected with the power supply system of the plane. This is connected by a line 141 to one of the pair of contacts 78 of the hold-in relay 72 and to one side of the motor 49. The other side of the motor 49 is connected by a lead 142 to a contact 143 of the selector switch 135 which cooperates with blade 136. The blade 136 is connected by a lead 144 to a contact 115 of the counter switch actuated by the arm 114, thence by lead 145 to ground at 146 or to the return line if an ungrounded system is used.

The lead 141 is also connected by a lead 147 to the pilot light 139, thence by lead 148 to the lead 144.

Connection is made from the contact 78 by a lead 150 to the contact 117 of the counter switch, thence by a lead 151 to a contact 152 of the selector switch which cooperates with the blade 137 of said switch. The blade 137 is connected by a lead 153 to the trigger switch 138 which in turn is connected to the power line 140. The lead 150 is also connected to the hold-in relay 72, thence by lead 154 to the lead 142. The contacts 77 and 78 of the hold-in relay are connected in series, thence by a lead 155 to the brush 94. The brush 95 is connected by a lead 156 to the actuating relay 100, thence by a lead 157 to the lead 148. The contacts 103 and 104 of the actuating relay 100 are connected by a lead 158 to the lead 147 and by a lead 159 to the output which controls the bomb release. The contacts 103 and 104 are connected in parallel to reduce the current load thereon.

The lead 156 is connected by a lead 160 to a contact 161 of the selector switch 135 which cooperates with the blade 137 thereof. The corresponding contact 162 of the switch 135 is connected by a lead 163 to ground at 146.

In the operation of this device, the selector switch 135 is thrown upwardly as shown in Fig. 2 to close contacts 143 and 152 in order to condition the apparatus to release bombs in the predetermined time sequence when the trigger switch 138 is closed by the pilot. When the switch 135 is thrown downwardly, the automatic timing mechanism is disconnected and the system is set up to release a single bomb when the trigger 138 is actuated.

Considering first the circuits for the automatic operation when the switch 135 is in its upper position the operator first sets the dial 13 in accordance with the known ground speed and the desired interval or spacing of the bombs along the ground. This, as pointed out above, serves to shift the balls 52 of the variable speed drive axially of the disc 43 so as to cause the roller 53 to be driven at a rate which is proportional to the computed frequency at which the bombs must be dropped. Hence the commutator 90 is driven to close the contacts 93 and 94 at this selected frequency. The counter-mechanism is also set by means of the knob 126 so that in its step-by-step actuation by means of the counter relay 100, the pin 113 will be brought into engagement with the spring arm 114 to open the counter switches 115 and 117 after a predetermined number of impulses have been produced. Hence the predetermined number of bombs will be dropped and the mechanism automatically de-energized by means of the counter switch.

Referring again to Fig. 2, the power supply may be traced from the power line 140, lead 141 to the motor 49 thence by the lead 142 switch 135 and lead 144 to the normally closed counter-contact 115, thence by lead 145 to ground at 146.

The motor 149 is thus energized and will continue to operate as long as the switch 135 is closed and as long as the counter-contact 115 is closed. The motor 49 will be de-energized however when the counter-contact 115 is opened by the pin 113 as above described.

Power is also supplied from the line 140, lead 141 and lead 147 to the pilot light 139, thence by leads 148 and 144 to the counter-contact 115 and by lead 145 ground. The pilot light thus indicates that the counter switch 115 is closed and that power is being supplied to the system. Power is also supplied from the power line 140 through leads 141, 147 and 158 to the actuating relay contacts 103 and 104, thence by lead 159 to the output. Hence at each actuation of the relay 100 a power impulse is supplied to the output lead 159. This power impulse is connected to suitable apparatus (not shown) for effecting the release of a single bomb.

Power to actuate the relay 100 is supplied from the power lead 140 through the trigger switch 138, lead 153, blade 137 and switch 135, contact 152, lead 151, normally closed contact 117 of the counter-switch, lead 150, hold-in relay contact 77, lead 155, to brush 94, thence from brush 93 and lead 156 to actuating relay coil 100, thence through leads 157, lead 148, and 144, through contact 115 of the counter-switch, thence by lead 145 to ground. A circuit is thus completed to the actuating relay 100 through the hold-in relay contact 77 whenever a circuit is completed between the brushes 94 and 93 by the commutator 90. This circuit is interrupted however when the contact 115 of the counter relay is opened.

The hold-in relay 72 is actuated by the remote trigger switch 138 by a circuit which includes switch 138, lead 153, blade 137 of switch 135, lead 151, contact 117 of the counter-switch, lead 150 to the relay 72 and thence by lead 154 and 142 to blade 136 of switch 135 thence by lead 144 to counter-switch contact 115 and by lead 145 to ground. Hence the hold-in relay 72 is actuated when the remote trigger switch 138 is closed. The contact 78 of the relay 72, however, constitutes a hold-in contact to supply power for holding the relay 72 closed after the trigger switch has been released. Hence after the hold-in relay has been actuated it will remain closed until the counter-contact 115 has been opened.

Referring to Fig. 1, it will be noted that the hold-in relay normally allows the latch 70 to engage the arm 68 and hold commutator 90 stationary. When the hold-in relay is actuated, however, the latch 70 is released allowing the commutator 90 to be driven through the clutch 66 and to produce timed impulses until it is again stopped by the release of the latch 70 by de-energization of the relay 72 which permits the latch 70 to again fall into position to engage the arm 68 as the arm reaches the latch 70 in its path of travel. The arm 68 is positioned to stop the commutator 90 with the brushes 93 and 94 on the conducting segments 91 of the commutator so that an impulse will be produced immediately when the trigger switch 138 is closed. It will be evident from the above that after the trigger switch 138 is closed, bomb release impulses will be produced in timed succession by the commutator 90 until the selected number of bombs have been released, at which time the counter-switch contacts 115 are opened to de-energize the system.

In case only a single bomb is to be released or in case the entire salvo is to be released simultaneously, the selector switch 135 is thrown to its down position. In this position the actuating relay 100 is directly under the control of the trigger switch 138 by a circuit which includes lead 153, blade 137 of the switch 135, contact 161, leads 160 and 156 to the relay 100, thence by leads 157, 148, and 144, to blade 136 of the switch 135 thence by contact 152 of said switch and lead 163 to ground. The actuating relay 100 is thus energized by the trigger switch 138 regardless of the condition of the remaining equipment.

It will be noticed that the counter switch contact 115 and 117 are connected to isolate the hold-in relay coil 72 so as to prevent accidental operation thereof through external apparatus which may also be connected to power line 140.

Although a specific embodiment of the invention has been shown for purposes of illustration, it is to be understood that the invention may be adapted to various uses and that changes and modifications may be made therein as will be readily apparent to a person skilled in the art.

The invention is only to be limited in accordance with the following claims.

What is claimed is:

1. A device for controlling the release of a string of bombs from a plane in timed sequence, comprising a make and break commutator, means settable in accordance with ground speed and with the desired spacing of the bombs along the ground, means actuated by said last means as a function of the computed frequency of release, a variable speed drive mechanism, a constant speed motor actuating said mechanism, means controlled by said last means to set said drive mechanism to drive said commutator at a speed proportional to said computed frequency, means including a friction clutch connecting said variable speed drive to drive said commutator, latch means normally holding said commutator against rotation, circuit means connected to be actuated by said commutator to produce impulses timed in accordance with the speed of rotation of said commutator, relay means to release said latch and to energize said circuit means, a control circuit connected to actuate said relay means, a holding circuit for said relay means to hold the same energized after the control circuit has been interrupted, counter means connected to respond to said impulses, means actuated by said counter means to release said relay and thereby stop said commutator and interrupt said impulses and means setting said counter means to actuate said last means after a predetermined number of impulses.

2. A device for controlling the release of a string of bombs in timed sequence from a plane, comprising a make and break commutator, means settable in accordance with ground speed and with the desired spacing of the bombs along the ground, means actuated by said last means as a function of the computed frequency of release, a variable speed drive mechanism, a constant speed motor actuating said mechanism, means controlled by said last means to set said drive mechanism to drive said commutator at a speed proportional to said computed frequency, means including a friction clutch connecting said variable speed drive to drive said commutator, latch means normally holding said commutator against rotation, circuit means connected to be actuated by said commutator to produce impulses timed in accordance with the speed of rotation of said commutator, relay means to release said latch and to energize said circuit means, a holding circuit for said relay means to hold the same energized after the control circuit has been interrupted, counter means connected to respond to said impulses, means actuated by said counter means to release said relay and thereby stop said commutator and interrupt said impulses, and means setting said counter means to actuate said last means after a predetermined number of impulses.

3. A device for controlling the release of a string of bombs from a plane in timed sequence, comprising a make and break commutator, means settable in accordance with ground speed and with the desired spacing of the bombs along the ground, means actuated by said last means as a function of the computed frequency of release, a variable speed drive mechanism, a constant speed motor actuating said mechanism, means controlled by said last means to set said drive mechanism to drive said commutator at a speed proportional to said computed frequency, means including a friction clutch connecting said variable speed drive to drive said commutator, latch means normally holding said commutator against rotation, circuit means connected to be actuated by said commutator to produce impulses timed in accordance with the speed of rotation of said commutator, relay means to release said latch and to energize said circuit means, and a control circuit connected to actuate said relay means.

4. A device for controlling the release of a string of bombs from a plane in timed sequence, comprising a make and break commutator, a variable speed drive mechanism, a constant speed motor actuating said mechanism, means to set said drive mechanism to drive said commutator at a speed proportional to the computed frequency, means including a friction clutch connecting said variable speed drive to drive said commutator, latch means normally holding said commutator against rotation, circuit means connected to be actuated by said commutator to produce impulses timed in accordance with the speed of rotation of said commutator, relay means to release said latch and to energize said circuit means, a control circuit connected to actuate said relay means, and a holding circuit for said relay means to hold the same energized after the control circuit has been interrupted.

LAWRENCE S. BROWN.

REFERENCES CITED

The following references are of record in the file of this patent:

UNITED STATES PATENTS

| Number | Name | Date |
|---|---|---|
| 1,616,186 | Harlow | Feb. 1, 1927 |
| 1,628,450 | Blanchard | May 10, 1927 |
| 2,209,380 | Bell | July 30, 1940 |
| 2,328,304 | Sorensen | Aug. 31, 1943 |
| 2,347,481 | Hooven | Apr. 25, 1944 |
| 2,348,722 | Boehm | May 16, 1944 |
| 2,396,197 | Peterson | Mar. 5, 1946 |